Dec. 2, 1930.                F. O. CLIZBE                1,783,280
                       ELECTROMAGNETIC BRAKE
                  Filed March 26, 1928      2 Sheets-Sheet 1
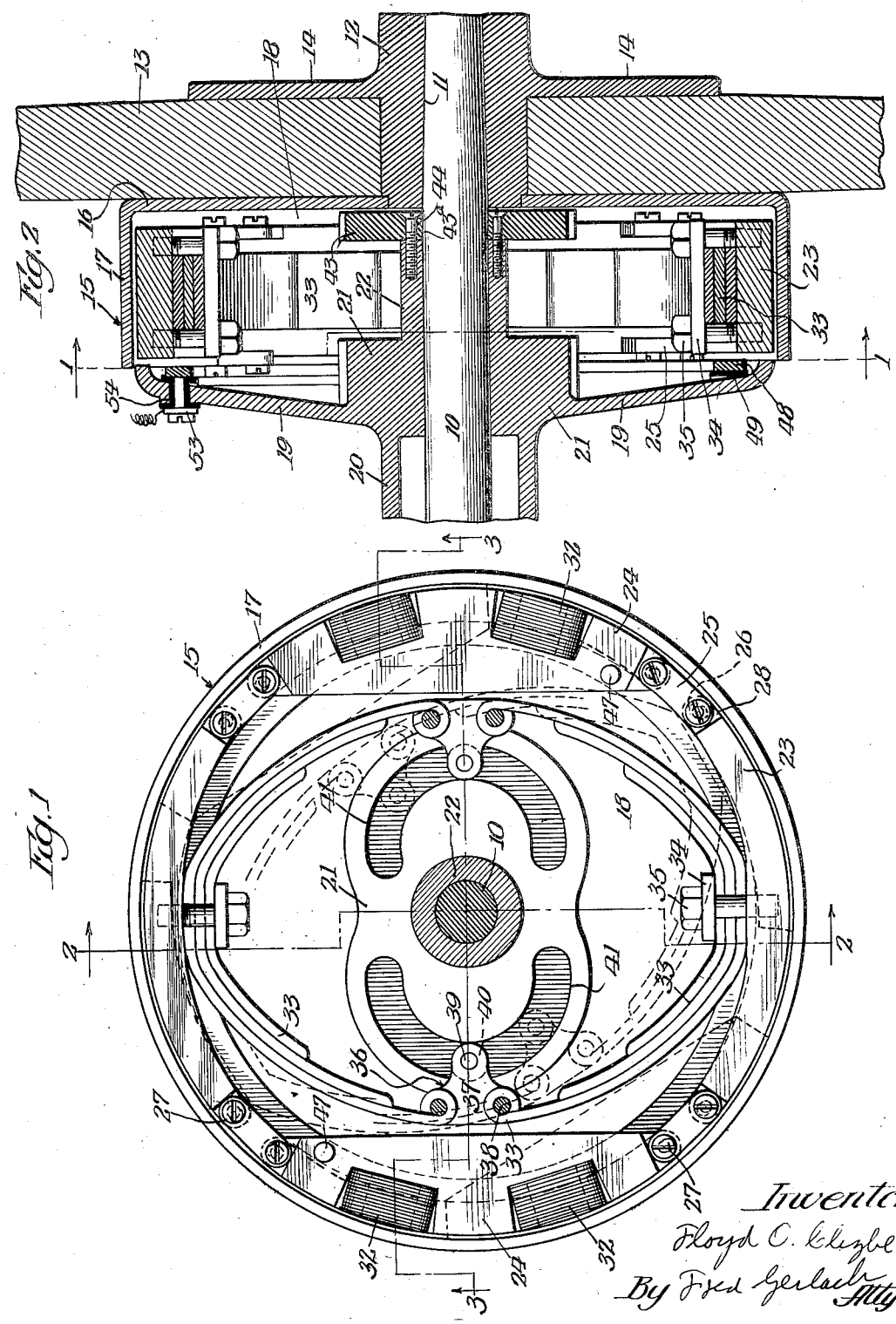

Dec. 2, 1930.   F. O. CLIZBE   1,783,280
ELECTROMAGNETIC BRAKE
Filed March 26, 1928   2 Sheets-Sheet 2
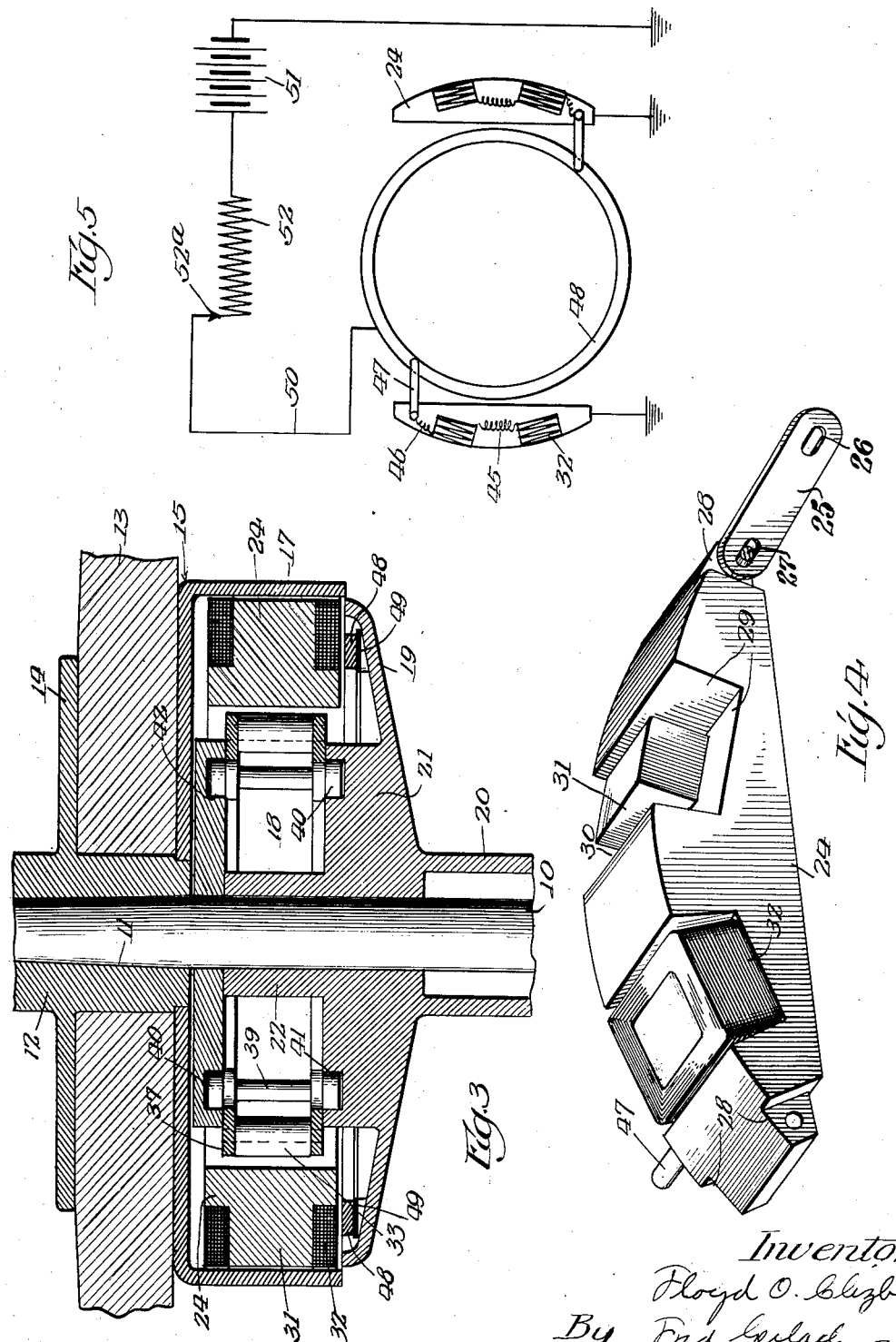
Inventor:
Floyd O. Clizbe
By Fred Gerlach Atty.

Patented Dec. 2, 1930

1,783,280

UNITED STATES PATENT OFFICE

FLOYD O. CLIZBE, OF CHICAGO, ILLINOIS

ELECTROMAGNETIC BRAKE

Application filed March 26, 1928. Serial No. 264,709.

The invention relates generally to electromagnetic brakes and more particularly to those brakes in which the electromagnets operating in conjunction with a source of electrical energy and circuit controlling means are adapted when energized to adhere to the rotating brake drum and impart movement to the brake shoes.

In brakes of this character whereof I am aware, the shoes are pivoted at one end thereof and the magnets are arranged so that when they are energized they will be attracted to the drum and rotated thereby into engagement with the distal ends of the shoes to force the latter outwardly into braking relation with the inner periphery or braking surface of the drum. In practice, these brakes have proved to be inefficient because the direct leverage arrangement does not give the shoes the necessary outward thrust to result in effective retardation of the rotating drum. One object of the present invention is to improve upon electromagnetic brakes of the aforementioned type by providing a construction wherein the magnets and shoes are connected together for conjoint rotary movement and a lever system of an improved character is made use of to force the shoes outwardly in response to this movement.

Another object of the invention is to include springs in the lever system which are under tension at all times and operate to return the magnets and shoes to their normal position when the magnets are deenergized.

A further object of the invention is to provide an electromagnetic brake which is of new and improved construction, in which the operating parts are compactly arranged within the brake drum and are so positioned relatively to each other that they may be readily assembled into operative position, and which includes but a comparatively small number of parts so that the brake as a whole may be produced at a low and reasonable cost.

A still further object of the invention is to improve and simplify the construction of the electromagnets and the electrical conductors therefor.

Other objects will be apparent from a consideration of the following detailed description.

In the drawings which accompany and form a part of this description or specification and in which like numerals of reference denote corresponding or like parts throughout the several views:

Figure 1 is a side elevational view of a brake embodying the invention;

Figure 2 is a section taken on the line 2—2 of Figure 1;

Figure 3 is a section taken on the line 3—3 of Figure 1;

Figure 4 is a perspective view of one of the electromagnetic shoes; and

Figure 5 is a diagrammatic view of the electrical circuit for the magnets.

The invention is exemplified in a brake mechanism comprising a drive shaft or axle 10, the outer end of which is tapered, as at 11, and provided with a hub 12. The latter is either splined to the tapered end of the shaft or is jambed thereon by a nut (not shown) as well understood in the art. Spokes 13 are connected to the disc part 14 of the hub and are provided at their inner sides with a brake drum 15. This drum consists of a side wall 16 which is bolted to the spokes or is secured thereto in any other suitable manner, and an annular wall 17 which is formed integrally with the side wall and projects inwardly therefrom. The walls 16 and 17 form together an open sided cylindrical chamber 18 in which are disposed the brake operating parts. The open side of this chamber is closed by a disc-like member 19 which is stationary and is shown as an integral part of the axle housing 20. The central portion of the member 19 is enlarged, as at 21, and is extended axially to form a tubular bearing member 22 for the outer end of the axle 10. This bearing member and the enlarged part 21 are disposed within the cylindrical chamber 18. The marginal portion of the disc-like member 19 cooperates with the contiguous part of the wall 17 to preclude entry of water, dirt and other undesirable matter into the interior of the brake drum where such matter might prevent the operation of the proper brake elements.

A pair of arcuate brake shoes 23 which are preferably arranged diametrically opposite to each other are disposed in the chamber 18 adjacent to the inner periphery of the annular wall 17. These shoes are adapted to be forced outwardly as hereinafter described into contact with the drum for braking purposes. A pair of soft iron shoe members 24 extend between the brake shoes and are connected thereto for conjoint rotation by pairs of links 25. The ends of these links are provided with slots 26 through which extend pivot bolts 27. The latter extend transversely through the ends of the shoes and members 24 and are provided with heads which prevent lateral displacement of the links. The ends of the shoes and members are provided with sockets 28 into which the ends of the links fit. A characteristic and an advantage of connecting the links to the shoes and members by bolt and slot connections is that the shoes and members although connected together for conjoint rotary movement are movable radially relatively to each other and consequently are free to move into or out of contact with the wall 17 of the brake drum. In other words, the bolt and slot connections permit the brake shoes to be shifted into engagement with the periphery of the drum without causing the shoe-members 24 to be pulled inwardly.

The outer faces of the soft iron shoe members 24 are curved to conform to the inner periphery of the wall 17. Each member is cut transversely and longitudinally, as at 29, to form a pair of core pieces 31 and square sockets 30 surrounding said pieces. Coils 32 of wire are disposed in the sockets and are wrapped around the core pieces 31 so as to form of the members 24 electromagnets which, when energized, tend to adhere or anchor themselves to the wall 17 and rotate therewith. This moment or rotary movement is in turn transmitted through the links 25 to the brake shoes 23 with the result that the annular series of shoes and members tend to rotate with the drum 15. This movement is taken advantage of by a lever system to press the shoes outwardly into braking relation with the drum. The lever system comprises a pair of elliptical leaf springs 33 which are clamped to the brake shoes by plates 34. The latter carry machine or cap screws 35 which are connected to the central portions of the shoes. The ends of the springs project inwardly and toward each other and each pair of contiguous spring ends is pivotally connected to a bracket or toggle device 36. The latter consists of a pair of T-shaped plates 37 which are spaced apart by two pins 38. The ends of the springs 33 extend between the plates 37 and are bent around the pins so as to be pivotally connected to the toggle device. A rod 39 extends through the central pieces of each set of plates, and this rod is provided at its ends with a pair of rollers 40 which are confined respectively in a pair of oppositely facing semi-circular or elliptical cam slots 41 and 42. The two cam slots 41 in which are confined the rollers on the inner ends of the rods 39 are formed in the enlarged part 21 of the stationary disc 19 and are arranged diametrically opposite each other. The two cam slots 42, in which are confined the rollers at the outer ends of the rods 39, are aligned with the slots 41 and are formed in the inner face of an elongated element 43 which is similar in shape to the part 21 and is rigidly connected to the bearing member 22 by bolts 44. The element 43 has formed therein a circular opening 43ª through which the axle 10 passes. The arcuate ends of the cam slots extend toward the central portion of the chamber 18 with the result that they operate to force the devices 36 toward each other when the rollers are shifted into said ends during rotation of the shoes and magnets. This inward movement contracts or brings together the ends of the leaf springs 33 thereby causing the central portions of said springs to bulge outwardly and force the shoes 23 into contact with the inner periphery of the drum wall 17. The springs 33 are inserted into place so that they are under sufficient tension to force normally the rollers 40 into the outer or central portions of the cam slots and to retain said rollers in such position. Thus when the magnets are deenergized the springs will operate to restore the members 24 and the brake shoes to their normal position. In this position, which is shown by full lines in Figure 1, the shoes 23 are spaced from the inner periphery of the wall 17 and the members 24 are loose so that they exert no frictional or breaking pressure against the drum. The springs 33 together with the cam slots and toggle devices exemplify a lever system which effectively forces the shoes into their braking position in response to rotary movement and restores the shoes and magnets to their respective normal or inoperative positions when the magnets are deenergized. Sufficient leverage is obtained by means of this system to permit the brake shoes to be formed of hard wear resisting material. By shaping the cam slots 41 and 42 as set forth the braking action takes place during rotation of the axle and drum in either a fore or aft direction. The shoe members 24 are of such magnetic capacity that when they are energized and drawn into contact with the drum, their tangential traction is greater than the opposing tangential pull of the brake shoes. The pressure of the springs 33 tending to restore the brake shoes and magnet members to their normal or inoperative position is sufficient to overcome any natural tendency of the magnets to adhere to the drum when said magnets are deenergized.

The coils 32 of each shoe member 24 are serially connected together by an insulated conductor 45 which extends between the socket portions of said member. The free end of one of the coils is grounded while the other coil is connected by an insulated conductor 46 to a brush 47 which is carried by the shoe member. This brush is slidably mounted in an insulated sleeve (not shown) and is pressed in any suitable manner against a conductor ring 48 which is disposed adjacent to the inner face of the disc member 19 and is spaced therefrom by an insulated piece 49. The ring 48 is connected by a conductor 50 to any suitable source of electrical current, such, for example, as a battery 51 which is grounded as illustrated in Figure 5. A resistance element or rheostat 52 is interposed in the conductor 50 so that the magnetic intensity of the solenoids may be controlled to vary the gripping or adhering characteristics of the shoe members 24. By running the contact 52$^a$ of the rheostat 52 off the resistance element, the circuit may be broken to deenergize the magnets. The conductor 50 is secured to a binding post which is electrically connected to the ring 48 and extends through a sleeve 54. The latter is formed of insulating material and passes through the disc member 19.

The operation of the brake will be as follows: Assuming that the drum 15 is rotating and it is desired to apply the brake, the magnets 32 will be energized by proper manipulation of the contact 52$^a$ with the result that the shoe members 24 will anchor themselves to the inner periphery of the rotating wall 17 and will thereby cause rotative movement to be imparted to the brake shoes. This movement is in turn transmitted to the springs 33 and the toggle brackets 36. The latter will be forced inwardly and toward each other by the action of the rollers cooperating with the cam slots and will contract the ends of the springs, thereby causing the central portions of the latter to bulge outwardly and press the shoes against the wall 17 to stop the rotation of the drum. Since the magnetic attraction and tangential traction of the magnets is always greater than the opposing pull of the brakes, the brake is positive in its action. The cam slots 41 and 42 are so constructed or shaped that as the turning moment increases the contraction of the ends of the springs also increases. This results in greater outward thrust being imparted to the shoes. If it is desired to facilitate the braking operation, the resistance element may be cut out to increase the magnetic effect of the solenoids. This operates to produce a stronger turning moment.

When the controlling circuit is opened, the magnets will at once become deenergized. This operates to release the rotary tension on the springs 33 and permits the ends thereof to spring outwardly as far as possible with the result that the toggle device will be forced to the central portions of the cam slots. During shift of the devices to said portions reverse rotation occurs which shifts the shoes and magnet members into their normal or inoperative positions. When the drum is rotated in a reverse direction, the brake is applied in exactly the same manner, the parts turning in the reverse direction, however.

The brake is free of complicated mechanisms, is positive in its actions, and may be operated with a minimum amount of power inasmuch as the braking force is derived from the motion of the drum or wheel to which the brake is applied. When the brake is used in connection with a vehicle, the controlling circuit may be connected to the usual storage battery and the rheostat contact positioned within easy reach of the operator.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a brake of the character described, the combination of a drum, a brake shoe, an electromagnet positioned adjacent to the drum and adapted when energized to be attracted to and rotated by the drum, said shoe being connected to the magnet so as to rotate therewith, and mechanism operable by the rotary movement of said shoe and magnet for forcing the shoe into contact with the drum.

2. In an electric brake, the combination of a drum, a pair of brake shoes, a pair of electromagnets positioned in alternating relation with respect to the shoes, said shoes and magnets being connected together for conjoint rotative movement and disposed in the drum, the magnets when energized being adapted to be attracted to the drum to cause the brake shoes to rotate therewith, and means responsive to rotary movement of said magnets and shoes, for forcing the shoes into contact with the drum.

3. In an electric brake, the combination of a drum, a plurality of brake shoes, a plurality of electromagnets, said shoes being arranged in alternating relation with the magnets and movably connected to the latter, the magnets being adapted when energized to be attracted to the drum and to rotate the shoes, and means responsive to rotary movement of the magnets and shoes, for forcing the shoes into contact with the drum.

4. In an electric brake, the combination of a drum, a plurality of brake shoes, a plurality of electromagnets arranged in alternating relation with the shoes, links between the shoes and magnets for connecting said shoes and magnets for conjoint rotative movement and independent radial movement; said shoes being adapted when energized to be attracted to the drum and to rotate the shoes, and means operable by the aforesaid conjoint rotative movement of the magnets and shoes, for pressing the shoes into engagement with the drum.

5. In an electric brake of the character described, the combination of a drum, a brake shoe, a soft iron shoe member shaped to fit against the inner periphery of the drum, said member having portions cut away to form a socket in the outer face thereof, a solenoid disposed in said socket and adapted when energized to cause the member to be attracted to and rotated by the drum, the shoe being connected to the magnet so as to rotate therewith, and means operable by rotary movement of said shoe and magnet for pressing the shoe into engagement with the drum.

6. In an electric brake of the character described, the combination of a drum, a brake shoe, an electromagnet connected to the shoe and adapted when energized to be attracted to the drum and to rotate said shoe, means responsive to the rotary movement of the shoe and magnet for forcing the shoe into engagement with the drum, and an electrical circuit for the magnet including an arcuate conductor member positioned adjacent to the drum, and a contact mounted on the magnet and slidable on said arcuate member.

7. In a brake of the character described, the combination of a drum, a brake shoe, an electromagnet adapted when energized to be attracted to and rotated by the drum, said shoe being connected to the magnet so as to rotate therewith, and mechanism responsive to the rotary movement of said shoe and magnet for forcing the shoe into contact with the drum, said mechanism comprising a cam.

8. In a brake of the character described, the combination of a drum, a brake shoe, an electromagnet adapted when energized to be attracted to and rotated by the drum, said shoe being connected to the magnet so as to rotate therewith, and mechanism responsive to the rotary movement of said shoe and magnet for forcing the shoe into contact with the drum, said mechanism comprising a stationarily mounted cam.

9. In a brake of the character described, the combination of a drum, a brake shoe, an electromagnet adapted when energized to be attracted to and rotated by the drum, said shoe being connected to the magnet so as to rotate therewith, and mechanism operable by the rotary movement of said shoe and magnet for forcing the shoe into contact with the drum, said mechanism comprising a stationary cam, and a spring element between the cam and shoe.

10. In a brake of the character described, the combination of a drum, a brake shoe, an electromagnet adapted when energized to be attracted to and rotated by the drum, said shoe being connected to the magnet so as to rotate therewith, and mechanism operable by the rotary movement of said shoe and magnet for forcing the shoe into contact with the drum, said mechanism comprising a stationary cam, and a spring element connected to the shoe and having means at one end thereof co-operating with said cam.

11. In a brake, the combination of a drum, a brake shoe disposed adjacent to the inner periphery of the drum, a spring element having the central portion thereof secured to the shoe, the ends of said element extending inwardly, cams operative when the shoe is rotated to bring together the ends of the element and thereby force outwardly the central portion of the element and move the shoe into engagement with the drum, and means for rotating said shoe.

12. In a brake, the combination of a drum, a brake shoe disposed adjacent to the inner periphery of the drum, a spring element having the central portion thereof secured to the shoe, the ends of said element extending inwardly, cams operative when the shoe is rotated to bring together the ends of the element and thereby force outwardly the central portion of the element and move the shoe into engagement with the drum, and electromagnetic means for rotating said shoe.

13. In a brake, the combination of a drum, a brake shoe disposed adjacent to the inner periphery of the drum, a spring element having the central portion thereof secured to the shoe, the ends of said element extending inwardly and being equipped with rollers, means forming cam slots in which the rollers are confined, said slots being operative when the shoe is rotated to shift the ends of the spring toward each other and force the central portion outwardly so as to cause the brake to be moved into contact with the drum, and means for rotating said shoe.

14. In a brake, the combination of a drum, a brake shoe disposed adjacent to the inner periphery of the drum, a spring element having the central portion thereof secured to the shoe, the ends of said element extending inwardly and being equipped with rollers, means forming substantially semi-circular cam slots in which the rollers are confined, said slots being operative when the shoe is rotated to shift the ends of the spring toward each other, so as to force outwardly the central portion and move the shoe into engagement with the drum, and means for rotating said shoe.

15. In a brake, the combination of a drum, a brake shoe positioned adjacent to the inner periphery of the drum, a U-shaped spring element having the central portion thereof secured to the shoe and the ends projecting inwardly, and means for forcing the ends of the spring towards each other to cause the central portion to be bulged outwardly and to jam the brake against the drum for braking purposes.

16. In a brake, the combination of a drum, a brake shoe positioned adjacent to said drum, electrically operated means connected to the shoe for imparting rotative movement thereto, and mechanism operable by such movement to force the shoe into contact with the drum for braking purposes.

17. In a brake, the combination of a drum, a brake shoe positioned adjacent to said drum, electromagnetic means connected to the shoe to impart rotative movement thereto, and mechanism operable by such movement to force the shoe into contact with the drum for braking purposes.

18. In a brake, the combination of a drum, a brake shoe positioned adjacent to said drum, an electromagnet adapted when energized to impart to the shoe rotative movement in one direction, and mechanism operable by such movement to force the shoe into contact with the drum, said mechanism including means for restoring the shoe to its normal position with the magnet is deenergized.

Signed at Chicago, Illinois, this 19th day of December, 1927.

FLOYD O. CLIZBE.